United States Patent
Brett

Patent Number: 6,072,499
Date of Patent: *Jun. 6, 2000

[54] DISC CONTROLLER WITH COLOR LOOK-UP TABLE

[75] Inventor: Stephen Brett, Sutton-at-Hone, Kent, United Kingdom

[73] Assignee: Pandora International Limited, Northfleet, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/628,807

[22] Filed: Apr. 5, 1996

[30] Foreign Application Priority Data

Apr. 7, 1995 [GB] United Kingdom .................. 9507258

[51] Int. Cl.$^7$ ..................................................... G06T 11/40
[52] U.S. Cl. ......................... 345/431; 345/186; 345/199; 345/358; 345/516
[58] Field of Search ..................................... 395/131, 358, 395/516–524; 345/186, 199, 516–524, 431, 358

[56] References Cited

U.S. PATENT DOCUMENTS

| | | |
|---|---|---|
| 4,897,840 | 1/1990 | Weiss et al. . |
| 5,254,977 | 10/1993 | MacDonald ............................. 345/150 |
| 5,434,957 | 7/1995 | Moller .................................... 395/131 |
| 5,463,480 | 10/1995 | MacDonald ............................. 358/520 |
| 5,726,778 | 3/1998 | Tanio ..................................... 358/501 |
| 5,949,409 | 9/1999 | Tanaka et al. .......................... 345/186 |

FOREIGN PATENT DOCUMENTS 2053619  2/1981  United Kingdom .

*Primary Examiner*—Mark R. Powell
*Assistant Examiner*—Motilewa Good-Johnson
*Attorney, Agent, or Firm*—McDonell Boehnen Hulbert & Berghoff

[57] ABSTRACT

A data processing system comprises a magnetic or optical disc 1, a disc controller 2, and a main data processing unit 5 communicating with the controller by means on an interface 6. The controller 2 comprises an internal processing unit which receives requests from the main data processing unit 5 for data to be read from the disc 1, and controls retrieval of the data from the disc 1 and transmission of data to the main data processing unit 5 via the interface 6. The controller 2 further comprises a buffer 3 for data read from the disc 1 prior to transmission to the main data processing unit 5. The controller 2 also comprises a look-up table 4 for modifying the data read from the disc 1 in accordance with predetermined. modification criteria prior to transmission to the main data processing unit 5. The system may be used in colour processing of image data, with the disc controller providing primary colour correction. There is also disclosed a method of handling image data in which a data structure in the form of a colour cube is preloaded by a colour processor with the cardinal vertices for interpolation to take place. The colour cube may be loaded with data corresponding to a relatively small range of colours. Colours which are within the range are processed through the cube, and colours which are outside of the range are not processed through the cube.

9 Claims, 1 Drawing Sheet

DISC CONTROLLER WITH COLOR LOOK-UP TABLE

BACKGROUND OF THE INVENTION

In a large number of cases, it is required to read an image from a disc and modify it in a "one dimensional" manner, that is for example, to create a new "red" content purely as a function of the existing red image. Thus, data is read from a bulk storage device, such as a magnetic hard disc or an optical disc, and under the control of a Central Processing Unit (CPU) is routed through a data table stored in RAM (Random Access Memory) which is in the CPU's memory map. This results in modified data which, in itself, may probably undergo further modifications. A conventional system uses a disc controller which includes a data buffer and communicates with the remainder of the system via a SCSI or other interface.

SUMMARY OF THE INVENTION

According to an invention disclosed herein, there is provided a controller for a bulk storage device for digital data, comprising internal processing means and memory means as integral parts of the controller, the processing means receiving requests from external data processing means for data to be read from the storage device and controlling retrieval of the data and transmission of data to the external data processing means, and the memory means being configured as a buffer for data read from the storage device prior to transmission to the external data processing means, wherein the memory means is further configured to modify the data read from the storage device in accordance with predetermined criteria and the modified data is transmitted to the external data processing means.

Generally, the external data processing means will comprises a central processing unit including a microprocessor, random access memory, and other components necessary for the operation of a microcomputer or a custom device, such as a digital color processor of the type disclosed in U.S. Pat. No. 5,450,500. While the external data processing means is distinct from the controller, they may be incorporated in the same unit as part of an integral system.

Preferably, the memory means of the bulk storage device has a first area configured as the buffer and a second area configured as a lookup table containing information for modifying data in the buffer in accordance with the predetermined criteria. Preferably, the predetermined criteria are user programmable. In a preferred arrangement the controller comprises part of a system for modifying image data, for example, a digital color processor, the controller providing primary color correction of the data read from the storage device.

This system has many advantages, the principal one being that it allows two modifications to take place in parallel. The first of these modifications could take place through the lookup tables in the disc controller, under the control of the microprocessor in the disc controller that controls the disc activity, and the second being under control of the main CPU, and either involving the mathematical calculation power of the CPU, of further lookup table processing using lookup tables on the CPU's RAM map.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

Reference is made to the accompanying FIG. 1, which illustrates one possible embodiment of the system. This shows diagrammatically a disc 1, a controller 2 having a buffer 3 and a lookup table ("LUT") 4, and a main processing unit 5 including a central processing unit and random access memory. The main processing unit 5 communicates with the disc controller 2 by means of an interface 6.

DETAILED DESCRIPTION OF THE PREFERRED EMBODIMENT

Figure 1:
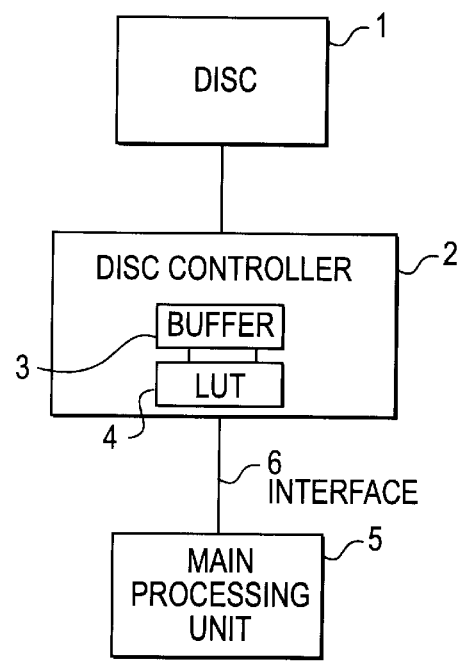

One important feature is that the incremental work to get this function incorporated into a disc controller is very small. Disc controllers already have a microprocessor to control activity of the disc, and already have RAM, as it is usually necessary to "buffer" data that is being written to or rad from the controller. All that is lacking is the necessary control software in the microprocessor code for the disc controller.

Currently, disc controllers are complete microprocessor control systems. They incorporate the following elements:

1. A microprocessor. Disc manufacturers use standard microprocessors, such as the ones used in desktop computers, as these give "economy of scale."

2. PROM (Programmable Read Only Memory). This contains the program information that makes the microprocessor control the disc.

3. RAM (Random Access Memory) This is the memory that the program is executed in.

4. External control input. This is an input to the Disc Controller Microprocessor, usually along the minicomputer's "bus," through which it receives data.

The typical flow of information is as follows: The main CPU will request that the Disc controller read, for example, logical blocks 3453 to 3457 from the disc. This will activate the software running in the Disc controller CPU. This will be typically running a "wait" loop, until it is requested to do something. The Disc Controller Microprocessor will then check that the requested disc blocks are valid (i.e. that they exist) and probably then check that the disc is running. It will then probably decode the requested logical blocks into physical blocks (i.e. that the requested blocks 3453 to 3457 are actually on platter 3, track 25, records 26–30. It will then wait until the existing transfer is complete, then move the heads to the required track, and actually cause the "read" to the place, into a buffer in the RAM of the Disc Controller's Microprocessor.

It will probably check the disc control register, to see if the transfer is complete, then check the "checksum" to verify that the transfer has (most probably) read valid data. At this point, the Disc Controller's Microprocessor will signal to the system microprocessor that the transfer is complete and that the data is present and correct in the Disc controller's RAM.

In accordance with an embodiment of the invention, there would be a change to the control or program code in the PROM of the Disc controller. A further logic stage would take place after the checksum verification. The extra code would command the Disc Controller Microprocessor to read the data from the buffer RAM, and use each point of this data to "index" into another buffer of data in RAM, which contains the lookup table that we are using. The data found at this address is then written back into the original buffer. When this has been done for each point in the buffer, the disc controller than signals to the system controller that the transfer is complete.

A second important feature considered in the context of the image data is the utilization of three dimensional data structures, which can be thought of as "color cubes."

A one dimensional lookup table is one that contains the only input parameter, and one (or one set) output parameter. An example of this may be a convention from imperial measures to metric. The input parameter may be length in feet, and the output parameter length n meters. Correspondingly, a two dimensional lookup table will take in two input parameters, and give one output parameter. An example of this may be the derivation of area from length and width. The two input parameters in this case are obviously length and width, and the derived parameter is the area.

Such lookup table principles can be extended into three or more dimensions. Color measurement or reproduction requires three parameters. Conversion from one "color space" to another is a "three-in" and "three-out" transformation, and therefore, well suited to a three dimensional lookup table.

One problem with such data tables is the amount of memory required. A sixteen input value one dimensional table takes sixteen memory locations. Correspondingly, a sixteen value, two dimensional table takes two hundred and fifty six memory locations, and a sixteen value, three dimensional table takes four thousand and ninety six memory locations.

Many techniques are known to avoid having to use too much memory. One such technique is disclosed in GB-A-1369702, which uses a three dimensional interpolation technique. In summary, this technique is to subdivide a 256×256×256 color cube into a 16×16×16 "cubelets". Real data points exist to define the "cubelets," but interpolation takes place to get intermediate points within a "cubelet." This technique is a three dimensional interpolation technique. In the same way as in a one dimensional case we may measure or calibrate an output value for series (usually at regular values) if input values, this can be extended to a two or even three dimensional function. In the case of color, it is usual to measure color values as an 8 or 10 bit value. This means a range of 0–255 or 0–1023. Let us consider the simpler 8-bit example. Because to measure a color signal, we need to quantify its red, green, and blue values, all of which are independent from each other (meaning that just because we have measured the red and green, we cannot "calculate" or guess the blue value).

Thus, for each of the 256 red values, there are 256 values that the green value could have, with 256 blue values for each red and green value. Thus, there are 256×256×256 possible different colors that we can describe with this system. Each of these input colors can have a different output color, itself described by a red, green, and blue set of values.

We could envisage this transform table as a "linear" system, with a table of each value of red from 0 to 255, combined with each value of green from 0 to 255, combined with each value of blue from 0 to 255.

Figure 2:
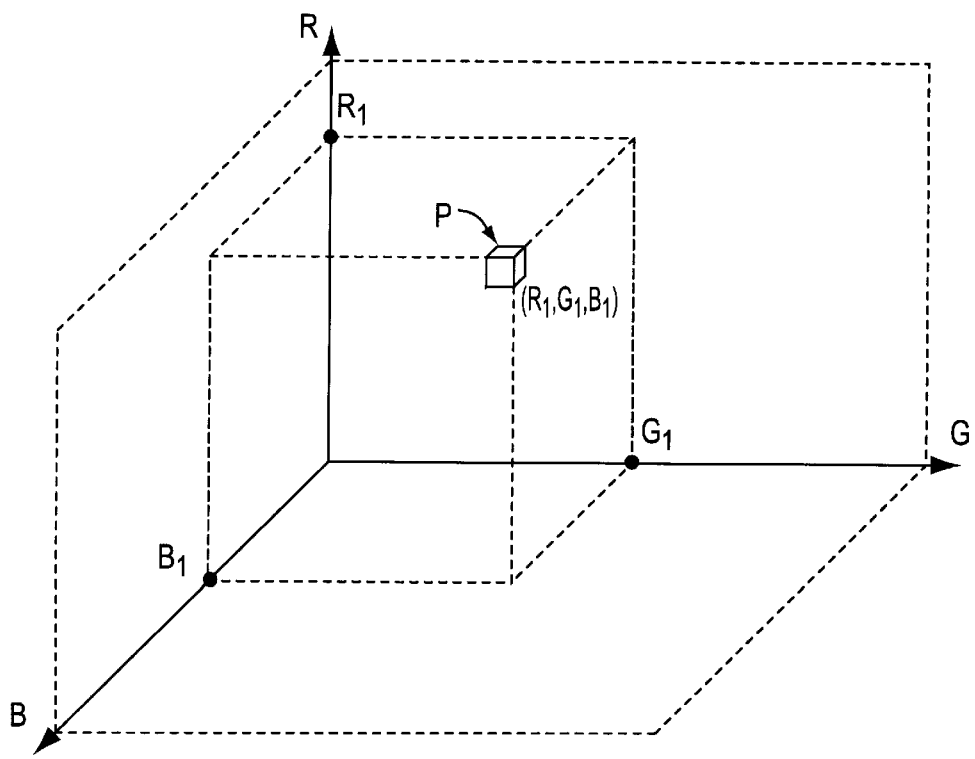

An easier way of envisaging this data is as "three dimensional cube," as shown in FIG. 2. We can imagine the red, green, and blue input axes as three mutually orthogonal (i.e. at right angles) axes R, G, and B. For a given combination of input red, green, and blue, ($R_1$, $G_1$, $B_1$), we describe a unique point a "pigeon hole" that contains an output color, specified in output red, green, and blue.

If we can either measure or calibrate output colors for a regular grid of input colors, we can "build" a grid of regular points within which we can calculate other points. Typically, we can measure or calculate, say, input axes in multiples of 16. Thus, we could "load" the cube with values as below:

| | | |
|---|---|---|
| R = 0 | G = 0 | B = 0 |
| R = 0 | G = 0 | B = 15 |
| R = 0 | G = 0 | B = 31 |
| R = 0 | G = 0 | B = 239 |
| R = 0 | G = 15 | B = 0 |
| R = 0 | G = 15 | B = 15 |
| R = 0 | G = 15 | B = 239 |
| R = 0 | G = 31 | B = 239 |
| R = 0 | G = 31 | B = 239 |
| R = 0 | G = 47 | B = 0 |
| R = 0 | G = 47 | B = 239 |
| R = 0 | G = 239 | B = 239 |
| R = 15 | G = 0 | B = 0 |
| R = 15 | G = 0 | B = 15 |
| R = 15 | G = 0 | B = 239 |
| R = 15 | G = 15 | B = 0 |
| R = 15 | G = 15 | B = 15 |
| R = 15 | G = 239 | B = 239 |
| R = 31 | G = 0 | B = 0 |
| R = 31 | G = 239 | B = 239 |
| R = 47 | G = 0 | B = 0 |
| R = 239 | G = 239 | B = 239 |

Note: In the above example, we have only 16 points, dividing the range up into 15 intervals, and covering the range from 0–239. We could, alternatively, have 17 points, dividing the range up into 16 intervals and covering the complete range. In practice, the very highest colors are not used in some color "scaling" systems and, thus, we will continue to example with range being specified by 15 intervals. It will be seen later that this move simplifies the necessary mathematics considerably.

Thus, there is "preloaded" the cardinal grid of points with "output" values contained at these cardinal input points.

For any generalized input point, we can "look" at the most significant four bits of the incoming R, G, and B values, and could used the input point R=18, G=55, B=81.

Thus, the 8 bit "Bit Pattern" is as follows:
R=000100010 G=00110111 B=01010001
Thus, the "most significant four" bits for these values are:
R=0001 G=0011 B=0101
Or, in Decimal
R=1 G=3 B=5

Thus, remembering that computer numbering starts at zero, we have derived the lower bounding "cardinal point" as the first value of red, third value of green, and fifth value of red (which themselves correspond to the values for R=16, G=48, and B=80).

the upper bounding "cardinal point" corresponds to R=32, G=64, and B=96. These two values, in three dimensional space, form a small cube, and are body centered diagonals of this cube.

All eight of these cube "corners" or vertices, are as follows:

| | | |
|---|---|---|
| R = 16 | G = 48 | B = 80 |
| R = 16 | G = 48 | B = 96 |
| R = 16 | G = 64 | B = 80 |
| R = 16 | G = 64 | B = 96 |
| R = 32 | G = 48 | B = 80 |
| R = 32 | G = 48 | B = 96 |
| R = 32 | G = 64 | B = 80 |
| R = 32 | G = 64 | B = 96 |

By the mathematical process of "trilinear interpolation" we can use the lower four bits of the general input point as "weighing factors" in the interpolation. In the above example, these are 0010, 1110, 0111, and 0001 (or 2, 7, and 1). Thus, on the red scale, we are ²⁄₁₆ths of the way from the point G=48 and the point at G=64, and ¹⁄₁₆ths of the way from the point at B=80 and the point at B=96. The output values can thus be accordingly "weighted" to find the output value that corresponds to this input point.

The already known techniques use a "preloading" phase, where the cardinal points of the cube can be calculated using a mathematical algorithm implemented in software using a general purpose microcomputer.

GB-A-2053619 teaches that each "cubelet" (defined by eight vertices) can be further broken down into six component tetrahedra sharing a common cube body diagonal axis.

The first step is to decide which cube is relevant. The second step is to decide which of six "tetrahedra" within that cube one is bounded by. The improvement here is that say we have a point with the same upper four bits, but the lower four bits of the red, green, and blue signals are all very small, say 1, 2, and 2. The "upper" bounding corner is thus a "long way" away from the "lower" bounding corner. Thus, the bounding tetrahedron has the values of:

| R = 16 | G = 48 | B = 80 |
| R = 32 | G = 48 | B = 80 |
| R = 16 | G = 64 | B = 80 |
| R = 16 | G = 48 | B = 96 |

3-D tetrahedronal interpolation can then be performed to find out an input value for the generalized input point.

It will be noticed that this tetrahedron is defined by four of the cube vertices. The six possible ways of choosing four of the eight points defines six possible tetrahedra.

There are mathmatical advantages of interpolating in this technique, and a "better" output control can be obtained from this technique. One reason for this is that all of the tetrahedra share a common "body diagonal" since the "body diagonal" represents the transition from black through grey to white. The human eye is particularly sensitive to small variations of color in the near grey colors. Having such an axis common between the tetrahedra means no mathematical discontinuities in the "gradient" of colors near grey. In the previous "cubic" techniques, the undue influence of other neighboring cube vertices could cause a discontinuity.

The cube systems described in the above referenced patents have a general purpose computer to pre-load the three dimensional data structure with algorithmically calculated values.

Viewed from another inventive aspect there is provided a method of handling image data in which a color cube of the type described above is preloaded by color processing means, such as a digital color processor (DCP) described in U.S. Pat. No. 5,450,500, with the necessary cardinal vertices for interpolation to take place.

This would enable a much slower (and cheaper) DCP to be built. The Present Standard TV Definition DCP handles data at a rate of 13.5 million bytes per second. A High Definition TV implementation would require a data rate of approximately five times this rate. By utilizing the DCP engine to load the necessary number of cardinal points into a three dimensional data structure, and by using a "double buffered" arrangement, where one "cube" is being loaded while the other is being used for color transform, there would be one twenty-fifth of a second (i.e. 40 ms) to calculate of 4096 values. Thus, the DCP compute engine only need run several orders of magnitude slower than at present.

In a significant number of real examples, there is a requirement to subtly alter a small range of colors, leaving all other colors alone. Conventional "color cube" transforms are not at all good for this sort of work, as being interpolative they can "smooth out" desired changes.

The solution of this is to load such a cubic data structure with a fine range of specific colors. Thus, colors that are not within the selected range of colors will not get processed through the cube, while the finely selected range of red colors will get processed, but the interpolation will only be over a small range. It may even get to the stage where the data structure is loaded with adjacent color (i.e. incremental R, G, B values) in which no interpolation will be required.

Viewed from another inventive aspect, there is provided a method of handling image data in which a color cube is loaded with data corresponding to a relatively small range of colors; colors which are within the range are processed through the cube, and colors which are outside of the range are not processed through the cube.

The importance of this is several fold. Firstly, by the time we get to 1:1 mapping (i.e. no interpolation) then obviously, we have no interpolation errors. Secondly, and less obviously, it allows the color conversion of colors with "key" signals in. This is a technique where one color, or a narrow range of colors are used or "reserved" to indicate "switching" to another color or picture. One such widely known technique using this is the so-called "bluescreen." In this technique, actors and object are filmed or recorded against a background of a particular blue. In the video domain this blue is then "recognized" and another picture source is substituted for this blue. In this way, actors can appear to "fly" across backgrounds. These techniques, although generically referred to as "blue screen" quite often use colors other than blue. Greens and oranges are sometimes used. The important criteria is to ensure that the "screen" color does not occur in the subject. Thus, it is important to keep the "special" colors to the value that they start at, without changing them. A conventional "cube" type color correction may well interpolate these colors to a different value, causing the "blue screen" process not to work. However, with the non-interpolative cube techniques, we can have a lookup table which manipulates a wide range of blues as the operator requires, without having the "special" blue or limited range of "special" blues change color.

The use of interpolation "cubes" in this case has many advantages over calculation techniques. We have to remember that the data the we wish to "color correct" is usually a motion picture sequence, usually arising from film or video sources.

U.S. Pat. No. 4,096,523 teaches the concept of scene by scene programming. By this is meant that with combine with the use of a "controller" (such as Pandora POGLE), a Color Corrector (such as the Pandora DCP of U.S. Pat. No. 5,450,500) and a "picture source" (such as a Telecine) one can associate, or "program" a color correction sequence where a given set of optimal or user specified color relating to a scene in the original.

As example of this is where there is a sequence of three consecutive scenes in a work. The first is shot outside, in bright sunshine. The second scene is shot indoors, and is too dark and "yellow" due to the color temperature of the lighting, and the third scene has the same requirements as the first. We wish to "program" a correction for each of these scenes so that in a mode where we want to transfer this material to videotape, we quickly reload the color settings in the vertical blanking interval.

The system set out above has a variable range of interpolation within the cube. There are advantages gained by a "cube" system even when loaded with a 1:1 interpolation, over a conventional DCP even though both of these may give identical numerical results. This main advantage is that the "DCP" speed in the 1:1 cube does not need to be anywhere as fast as a conventional DCP. This is because with the cube, we only need to load 4096 points (which is like "color correcting" a tiny image that has only 4096 pixels, as opposed to the million to five million pixels in a SD or HD image).

Coupline the "cube loading" (generally with a "full range" cube) with the "scene by scene" programming, a fairly simple computer system with one "cube" could color correct video picture streams in "real time." This would be accomplished by the following steps:

1. Before the first frame of the first scene, the CPU runs the DCP "Software" Implementation, that would load the first "cube" with the color correction lookups that correspond to the adaptor chosen and stored parameters for that scene (only 4096 "correction points" are needed).
2. One then transfers the video data (typically 1 million points per frame) through the lookup tables, to provide corrected data.
3. After the conversion of the last frame of the first scene, one reloads the cube, during the vertical blanking interval, with the new cube data, corresponding to the operator stored settings for scene two.
4. One then continues as in 2.

A further variation of the above, for slower computer architecture, is to have two "cubes" (be they data structures within a single CPU computer, or multiple processors on larger computers). This method allows for the creation of a second scenes "cube" during the transferring of the data for the first scene through its cube. This removes the restriction to be able to recalculate the contents of a cube during the vertical blanking interval.

There is sometimes the requirement to perform several changes of color within one picture. The already proposed architecture of the Pandora DCP is U.S. Pat. No. 5,450,500 contains a multi-channel system, with a "priority logic" that arbitrates for a color that is within the selected color range of more than one channel. This allows the rapid "switching" of channels to try out different priority setups.

This effect would be difficult to emulate with the slower DCP "compute engine" and cube technique, as changing the priority to necessitate reloading the cube.

The solution of this is the use of multiple cubes. Each of the "channels" could load a separate cube. Typical computes used within the film and video facilities companies contain multiple processors in order to "render" graphics at a resonable speed. One such computer is the Silicon Graphics "Onyx" computer, which can have up to 20 processors. When such a computer is used for color manipulation work, either a hardware DCP "compute engine"could be added, or a software emulation of the algorithms could be used to load cube like data structures. Each of the processors in the Onyx could emulate one channel of the DCP. This would utilize the processing power of such a platform of the "Onyx," and also enable the rapid switching of priorities of channels.

In U.S. Pat. No. 5,450,500 there are references to other picture attributes, such as the x and y addresses of the picture, and attributes such as "sharpness" or texture related attributes, such as "grassiness," "graveliness," or "woolliness." These can be incorporated in the "cubic" data structures by extending the dimensionality. Three dimensions are required for a three attribute picture, such as red, green, and blue. Four dimensions would be required for pictures with a "sharpness" attribute per pixel. Mathematically, all of the above teaching can be extended into a 4-D space, and even to higher dimensions if required.

One practical example of the above is a country scene containing a number of constituents. For example, consider a female model, in a green dress, sitting in a field of grass, with a blue sky. It is required to artistically bring out detail in the green dress, and make it less blue. Assume that the attributes of the picture are derived and stored, in this case, as red, green, blue, sharpness and grassiness. We will need a 5-D low in blue and red, and a low in "grassiness," we will make higher in "sharpness." This change will make only the green dress go sharper, and not over-enhance the detail in the grass.

What is claimed is:

1. A data processing system comprising:
   a bulk storage device for storing digital image data;
   main data processing means comprising a central processing unit and random access memory;
   a storage device controller for the bulk storage device arranged in data communication with the bulk storage device; and
   an interface arranged between the main data processing means and the storage device controller, the storage device controller being arranged to communicate with the main data processing means via said interface;
   wherein the storage device controller comprises as integral parts of the storage device controller:
      internal processing means arranged to receive requests from the main data processing means for image data to be read from the bulk storage device, arranged to control retrieval of image data from the bulk storage device and arranged to control the transmission of image data to the main data processing means via the interface; and
      internal memory means configured as a buffer for image data read from the bulk storage device prior to transmission of the image data to the main data processing means,
      the internal memory means comprising:
         means for storing information for modifying said image data in accordance with predetermined colour modification criteria; and
         means for modifying the image data read from the bulk storage device in accordance with the stored information for modifying said data prior to transmission of the image data to the main data processing means.

2. The data processing system of claim 1, wherein said internal memory means of said storage device controller comprises:
   a first area configured as said buffer; and
   a second area configured as a lookup table, said lookup table comprising said means for storing information for modifying said image data.

3. The data processing system of claim 2, adapted to modify colour characteristics of image data stored by said bulk storage device, wherein said second area of said internal memory means of said storage device controller is configured as a lookup table containing information for providing primary colour correction of said data in said buffer.

4. The data processing system of claim 3, wherein said information contained in said lookup table is programmable by a user.

5. The data processing system of claim 3, wherein said main data processing means is arranged to provide further colour correction of the image data transmitted to said main data processing means by said storage device controller via said interface.

6. A storage device controller for controlling a bulk storage device arranged to store digital image data, the storage device controller comprising as integral parts of the storage device controller:

internal processing means arranged to receive requests from an external data processing means for image data to be read from the bulk storage device and arranged to control retrieval of the image data from the bulk storage device and to control transmission of the image data to the external data processing means; and internal memory means configured as a buffer for image data read from the bulk storage device prior to transmission to the external data processing means, and further configured to store information for modifying said image data in accordance with predetermined colour modification criteria, and to modify the image data read from the bulk storage device in accordance with the stored information for modifying said image data, the modified image data being transmitted to the external data processing means.

7. A method of processing image data in the form of values expressed in a three dimensional colour co-ordinate system, the method comprising the steps of:

providing a three dimensional data structure in the form of a colour cube having three axes, each of which corresponds to one of the dimensions of said colour co-ordinate system, said data structure comprising a plurality of storage locations, each referenced by an input colour co-ordinate value specifying a co-ordinate on each of said axes;

preloading the data structure with a plurality of cardinal input co-ordinate values and a corresponding plurality of cardinal output co-ordinate values, each cardinal output co-ordinate value being stored at a said storage location referenced by a respective cardinal input co-ordinate value; and performing an interpolation on an input co-ordinate value of the image data by reference to at least one cardinal input co-ordinate value and at least one cardinal output co-ordinate value to derive an output co-ordinate value for said input co-ordinate value, wherein the preloading step is performed by a digital colour processor.

8. A method of processing image data in the form of values expressed in a three dimensional colour co-ordinate system, the method comprising the steps of:

providing a three dimensional data structure in the form of a colour cube having three axes, each of which corresponds to one of the dimensions of said colour co-ordinate system, said data structure comprising a plurality of storage locations, each referenced by an input colour co-ordinate value specifying a co-ordinate on each of said axes;

loading said data structure with data in the form of a plurality of input co-ordinate values and a corresponding plurality of output co-ordinate values, each output co-ordinate value being stored at a said storage location referenced by a respective input co-ordinate value, the input co-ordinate values corresponding to a relatively small range of colours; and selecting from image data in the form of co-ordinate values, co-ordinate values which are within said range and processing the selected co-ordinate values by reference to said input co-ordinate values and said output co-ordinate values, wherein colours which are outside of said range are not processed by reference to said data structure.

9. A data processing system comprising:

main data processing means comprising a central processing unit and random access memory;

disc means for storing digital image data; and disc controller means for controlling the disc means, the disc controller means being arranged in data communication with the main data processing means, said disc controller means further comprising as integral parts thereof:
  internal processing means; and
  internal memory means comprising buffer means and data modification means,
  wherein the data processing system is configured such that, in use, the main data processing means communicates a request for stored digital image data to the internal processing means, the internal processing means controls retrieval of the requested digital image data from the disc means, the requested digital image data is retrieved from the disc means into the buffer means, the digital image data in the buffer means is modified by the data modification means in accordance with predetermined colour modification criteria, the modified digital image data is transmitted to the main data processing means under the control of the internal processing means.

* * * * *